United States Patent Office 2,984,644
Patented May 16, 1961

2,984,644

BUTYL RUBBER/HETEROCYCLIC NITROGEN BASE RUBBER BLEND

Robert C. Wheat, Bartlesville, Okla., assignor to Phillips Petroleum Company, a corporation of Delaware No Drawing. Filed Aug. 26, 1957, Ser. No. 680,389

9 Claims. (Cl. 260—45.5)

This invention relates to rubber having high flex life or, more particularly, material which is a blend of butyl rubber with a small amount of a polymer prepared by polymerizing a conjugated diene with a minor amount of a copolymerizable heterocyclic nitrogen base.

In many applications, rubber products are subjected to continuous flexing. Where these products are also subjected to high temperatures, their service life is frequently rather low. Such applications include belts used for blowers and fans in hot air ducts, conveyor belts, and the like.

An application which has been particularly severe is that of the airbag used in the production of tires. In order to vulcanize the tire, an inflatable bag is inserted in the tire before cure, and heat and pressure are subsequently applied externally and internally to cure the tire. Such bags are subjected to high temperatures in use. The bag is either a separate one or, in the Bag-O-Matic press, a bladder which is clamped in the mold is used. In such a press, steam is introduced into the bladder which expands to shape the tire and to force it into contact with the interior mold surface. Following cure, the press is opened and the bladder deflates and is forced into its extended collapsed condition by the operation of the machine, after which the tire is removed over the top of the bladder.

My invention relates to compositions which have a much greater life when used in these applications in which they are subjected to high temperatures and repeated flexing.

The following are objects of my invention.

An object of my invention is to provide rubber products which have high flex life. A further object of my invention is to provide a new rubbery composition, said composition being a mixture of a major amount of butyl rubber and a minor amount of a polymer prepared by polymerizing a major amount of a conjugated diene and a minor amount of a copolymerizable heterocyclic nitrogen base.

Other objects and advantages of this invention will become apparent to one skilled in the art upon reading the accompanying disclosure.

Broadly, my invention is based upon the discovery that the flex life of butyl rubber can be greatly extended by the incorporation of a small amount of a polymer prepared by polymerizing a major amount of a conjugated diene and a minor amount of a copolymerizable heterocyclic nitrogen base. The amount of the copolymer which is incorporated with the butyl rubber must be maintained within quite narrow limits and if these limits are not observed, a product having a poorer flex life than that of the butyl rubber is obtained. I believe that the final composition should contain 93 to 97 weight percent of the butyl rubber and the greatest improvement is obtained when the composition contains 95 to 97 weight percent of the butyl rubber.

Butyl rubber is well known in the art and is commonly used for the production of inner tubes and for tire curing bladders. It can be produced by polymerization of a major portion of an isoolefin, preferably isobutylene, with a minor portion, commonly 1 to 2 mol percent, of a conjugated diene such as 1,3-butadiene, piperylene, 2,3-dimethyl-butadiene or isoprene. A low temperature method for the polymerization of such monomers is disclosed in detail in U.S. Patents 2,356,128, 2,356,129, and 2,356,130 to Thomas and Sparks. The preferred products are rubbery plastic polymers. One commercial product widely known in the trade and which is satisfactory for use in the practice of this invention has been designated as GR–I. As used in this disclosure, the term "butyl rubber" refers to the above class of rubbers. A preferred butyl rubber is that made with a major amount (more than 75 percent of total monomer weight) of isobutylene.

The copolymers which are used in admixture with the butyl rubber are prepared by copolymerization of a conjugated diene, preferably 1,3-butadiene with a heterocyclic nitrogen base monomer of the pyridine and quinoline series. Preferred conjugated dienes are, in addition to the 1,3-butadiene, isoprene, piperylene, methylpentadiene, and 2,3-dimethyl-1,3-butadiene. These nitrogen-containing monomers contain a

substituent where R is either the hydrogen or methyl group. Various alkyl substituted derivatives are applicable, but it is generally preferred that the total number of carbon atoms in the nuclear-substituted alkyl and aryl groups, in addition to the vinyl or alpha-methylvinyl group, should not be greater than 12, and the preferred of these alkyl groups are methyl and/or ethyl. Examples of such compounds are: 2-vinylpyridine; 4-vinylpyridine; 2,4,6-trimethyl - 5 - vinylpyridine; 3,4,5,6-tetramethyl-2-vinylpyridine; 3 - ethyl - 5-vinylpyridine; 2-vinyl-5-ethylpyridine; 2 - methyl - 5 - vinylpyridine; 4,6-dimethyl-2-vinylpyridine; 2,6-diethyl - 4 - vinylpyridine; 2-isopropyl-4-vinylpyridine; 2 - vinyl-5-propylpyridine; 2-vinyl - 5 - butylpyridine; 2 - vinyl-5-hexylpyridine; 2 - vinyl - 5 - heptylpyridine; 2 - methyl - 5 - undecyl-6-vinylpyridine; 2,4 - dimethyl-5,6-dipentyl-3-vinylpyridine; 2 - methyl-3,5 - di(alpha-methylvinyl)pyridine; 2 - vinylquinoline; 2-vinyl - 8 - ethylquinoline; 4-hexyl-5-vinylquinoline; 4-dodecyl - 5 - vinylquinoline; 3,4,5,6-tetramethyl-2-vinylquinoline; 1 - vinylisoquinoline; 5-methyl-1-isopropenylisoquinoline, and the like.

In the preparation of these nitrogen-containing polymers, it is understood that one or more of the conjugated dienes can be copolymerized with one or more vinylpyridines or vinylquinolines. The preferred polymers will be those having at least one conjugated diene unit for each vinylpyridine or vinylquinoline unit in the polymer. As long as the diene component and the nitrogen-containing component are present in significant quantities, the relative proportions can vary widely. However, it is preferred that each be present in an amount of at least 10 percent by weight based on the total monomers and when solid polymers are used it is preferred that the diene component be present in major amount. These polymers can be prepared in any convenient manner, i.e., mass or emulsion polymerization. These nitrogen-containing polymers can range from liquids to hard rubbers. Generally they will range from syrupy materials of a viscosity of at least 100 Saybolt Furol seconds at 100° F. to rubbery materials having a Mooney (ML-4) of 60 or greater.

The amount of nitrogen-containing polymer to use with the butyl rubber will depend upon the amount of nitrogen-containing monomer sustituents in the polymer.

Commonly the nitrogen-containing polymer should be used in amounts of 3 to 7 parts by weight for, correspondingly, 97 to 93 parts of the butyl rubber to give upon 100 parts of the final product. The desired ratio of the two types of polymers can be determined by simple tests.

The blended stocks can be rolled into sheets, molded, extruded, or otherwise formed and shaped and then cured to give the desired article of commerce.

The following examples illustrate my invention and demonstrate the necessity of maintaining the two polymeric materials within the limitations set forth above.

Example I

For this example, a rubbery polymer of approximately 50 Mooney (ML–4) was prepared by emulsion polymerization at 41° F. using the following recipe.

| | Parts by weight |
|---|---|
| Water | 230 |
| 1,3-butadiene | 75 |
| 2-methyl-5-vinylpyridine | 25 |
| Potassium fatty acid soap | 6 |
| KCl | 0.5 |
| Tamol N[1] | 0.3 |
| Sodium formaldehyde sulfoxylate | 0.1 |
| $FeSO_4 \cdot 7H_2O$ | 0.04 |
| Ethylene diamine tetraacetic acid | 0.06 |
| p-Menthane hydroperoxide | 0.1 |
| Tertiary dodecyl mercaptan | 0.22 |
| Shortstop (Goodrite 3955[2]) | 0.15 |
| Antioxidant (BLE[3]) (percent based on polymer) | 1.25 |

[1] Sodium salt of naphthenic sulfonic acid condensed with formaldehyde.
[2] 50/50 mixture of sodium dimethyldithiocarbamate and sulfur in the form of sodium polysulfide.
[3] High temperature reaction product of diphenylamine and acetone.

The butyl rubber in this work was a commercial product labeled GR–I–17 obtained from Reconstruction Finance Company, Office of Synthetic Rubber, Sales Division, Washington, D.C. It was prepared by polymerizing 97.5 weight percent isobutylene to 2.5 weight percent isoprene, the product having 1.48 percent unsaturation and a molecular weight of 444,500.

The products were blended in a Banbury mixer to give a uniform blend. Cold water was circulated in the Banbury. A 5.5 minute mixing cycle was used, the chemicals and black, except for the curatives, being added one-half at three minutes and the balance at four minutes. The stocks were given two cool remills on a roll mill, the curatives being added on the first remill. The curing recipe used for these compounds was as follows:

| | Parts by weight |
|---|---|
| Rubber | 100 |
| Carbon black | 50 |
| Plasticizer oil | 4 |
| Zinc oxide | 5 |
| Petrolatum | 2 |
| Stearic acid | 2 |
| Dibenzoyl-para-quinone dioxime | 2 |
| Sulfur | 2 |
| Red lead | 8 |

The products were cured 30 minutes at 307° F. and the flex life determined. To determine the properties of the products on aging, they were aged in a pot heater at 100 p.s.i. steam, this being a severe test. For the aging test, steam pressure was applied, released in 5 minutes, raised to 100 pounds, and this cycle repeated for the time indicated in the following table which presents the flex life data for these materials.

| Butyl Rubber/Butadiene/2-Methyl-5-Vinylpyridine Copolymer Ratio | Original, M | Aged in Pot Heater 100 lbs. steam | |
|---|---|---|---|
| | | 24 Hours, M | 48 Hours, M |
| 100/0 | 20.8% | | |
| 99.5/0.5 | 30% | 22% | 69.0 |
| 98.5/1.5 | 15.3% | 18.7% | 46.7% |
| 97/3 | 12.5% | 15% | 20.7% |
| 95/5 | 12% | 19% | 34.0% |

In presenting results of flex tests in this work, numbers without a percent sign indicate the thousands of flexures to complete failure and those indicated by percent are the percent broken at 50,000 flexures. From the above data, it will be apparent that considerable improvement is not obtained until 3 to 5 parts of the butadiene/2-methyl-5-vinylpyridine are incorporated in the butyl stock.

Example II

Another series of runs were made using the polymers as set forth above but with a slightly different curing system. For this work, the following compounding recipe was used.

| | Parts by weight |
|---|---|
| Rubber | 100 |
| Carbon black | 50 |
| Zinc oxide | 5 |
| Stearic acid | 0.5 |
| Sulfur | 2 |
| Thiuram disulfide | 1 |
| 2,2'-dibenzothiazyl disulfide | 1 |

These materials were mixed according to the same method and flex life determined on the original and after oven aging for 24 hours at 212° F. The data are presented in the following table:

| Butyl Rubber/Butadiene/2-Methyl-5-Vinylpyridine Copolymer Ratio | Flex Life | |
|---|---|---|
| | Original, M | Oven Aged, M |
| 100/0 | 6.4 | 3.5 |
| 97/3 | 96.0 | 40.0 |
| 95/5 | 80.0 | 82.0 |
| 90/10 | 0.1 | 0.1 |

This table illustrates that the properties of the material deteriorate greatly when larger than the specified amounts of the nitrogen-containing polymer are used. However, when 3 to 5 parts of this polymer are employed, greatly extended flex life is obtained.

Example III

Another series of runs were made using the polymers and the curing recipe of Example I. These runs were made using 1, 3, 5, 7, and 9 parts of the butadiene/2-methyl-5-vinylpyridine copolymer per 100 parts of the total composition. The flex life was determined and is set forth in the following table.

| Butyl Rubber | Butadiene/2-Methyl-5-Vinyl-pyridine Copolymer | Flex Life—Aged in Pot Heater, 100 p.s.i. steam | | |
|---|---|---|---|---|
| | | Original, M | 24 Hours, M | 72 Hours, M |
| 100 | | 26.7% | (¹) | |
| 99 | 1 | 15% | (¹) | |
| 97 | 3 | 12% | 13.3% | ²7.5% |
| 95 | 5 | 6.7% | 15% | ²13.3% |
| 93 | 7 | 8% | 25% | ²23.0% |
| 91 | 9 | 13.3% | 62.5% | ²33.3% |

¹ Not run due to poor condition of specimen.
² Small surface cracks developed between holes.

Again, it is apparent that the optimum level of the nitrogen-containing polymer is in the 3 to 5 parts range where long flex life at elevated temperatures is required.

*Example IV*

Another series of runs were made wherein various polymers were incorporated in butyl rubber. These polymers included the rubbery 1,3-butadiene/2-methyl-5-vinylpyridine copolymer made according to the recipe of Example I, two liquid 1,3-butadiene/2-methyl-5-vinylpyridine copolymers (one prepared by mass polymerization and one by emulsion polymerization) and, as a control, a liquid homopolymer of 1,3-butadiene prepared by mass polymerization.

Each product was compounded according to the following recipe and portions were cured for 30 and 45 minutes at 307° F.

|  | Parts by weight |
| --- | --- |
| Butyl rubber | 100 |
| Added polymer | 0 or 3 |
| Carbon black | 50 |
| Zinc oxide | 5 |
| Stearic acid | 1 |
| Plasticizer | 10 |
| Tetramethyl thiuram disulfide | 1 |
| Benzothiazyl disulfide | 1 |
| Sulfur | 2 |

Following cure, flex life was determined for each of the products, the results being set forth in the following table.

30 MINUTE CURE AT 307° F.

| Additive | Original, M | Oven Aged 24 Hr. at 212° F., M | Pot Heater Aged 24 Hrs., 100 p.s.i. steam, M |
| --- | --- | --- | --- |
| None | 6.1 | 4.5 | 30.5% |
| Rubbery butadiene/2-methyl-5-vinylpyridine copolymer | 33.6 | 11.8 | 36.6% |
| Liquid butadiene/2-methyl-5-vinylpyridine copolymer (mass polymerization) | 20.0% | 27.2% | (¹) |
| Liquid butadiene/2-methyl-5-vinylpyridine copolymer (emulsion polymerization) | 46.8 | 24.0 | 14.2% |
| Liquid polybutadiene | 14.0 | 11.2 | 17.6% |

45 MINUTE CURE AT 307° F.

| None | 6.1 | 5.2 | 24.2% |
| --- | --- | --- | --- |
| Rubbery butadiene/2-methyl-5-vinylpyridine copolymer | 30.0 | 12.8 | 37.5% |
| Liquid butadiene/2-methyl-5-vinylpyridine copolymer (mass polymerization) | 19.1% | 41.9% | (¹) |
| Liquid butadiene/2-methyl-5-vinylpyridine copolymer (emulsion polymerization) | 26.4 | 19.8 | 13.3% |
| Liquid polybutadiene | 12.0 | 7.5 | 15.3% |

¹ Breaks on surface but not extending from punched holes.

The above data show that a considerable improvement is obtained when the heterocyclic nitrogen base containing polymer is incorporated in the butyl rubber when compared to the base rubber with no additive or with addition of the liquid polybutadiene.

The mass polymerized liquid copolymer of 1,3-butadiene and 2-methyl-5-vinylpyridine was prepared by dissolving, on a weight basis, 75 parts of 1,3-butadiene and 25 parts of 2-methyl-5-vinylpyridine in 150 parts of normal heptane. Finely divided sodium was added as the catalyst in an amount of 2 parts per 100 parts monomers and polymerization was effected at a temperature in the range of 180 to 210° F. and a pressure of 25 p.s.i.g. The product had the following properties.

| Viscosity, cs. at 100° F. | 9535 |
| --- | --- |
| Ash content, weight percent | 0.002 |
| Gardner color | 15 |
| Combined 2-methyl-5-vinylpyridine (wgt. percent) | 25.2 |

The emulsion liquid 1,3-butadiene/2-methyl-5-vinylpyridine was prepared at 41° F. using the following recipe.

|  | Parts by weight |
| --- | --- |
| 1,3-butadiene | 75 |
| 2-methyl-5-vinylpyridine | 25 |
| Water | 200 |
| Potassium fatty acid soap | 5 |
| KOH | 0.05 |
| KCl | 0.2 |
| Daxad 11¹ | 0.2 |
| Ethylenediamine tetraacetic acid | 0.04 |
| Sodium formaldehyde sulfoxylate | 0.1 |
| Ferrous sulfate heptahydrate | 0.04 |
| p-Menthane hydroperoxide | 0.1 |
| Tertiary dodecyl mercaptan | 15 |

¹ Sodium salt of condensed alkyl aryl sulfonic acid.

At about 60% conversion, the reaction was short-stopped by the addition of 0.2 part of di-tert-butylhydroquinone and the product, a sticky liquid, was recovered.

The liquid polybutadiene was prepared in normal heptane using a 1,3-butadiene to heptane ratio of 0.5. The catalyst was finely divided sodium in an amount of 2 weight percent based on the butadiene and the polymerization was carried out at a temperature of 200 to 210° F. and pressure of 25 p.s.i.g. The polymer had the following properties.

| Viscosity, Saybolt Furol seconds at 100° F. | 1628 |
| --- | --- |
| Gardner color | 10 |
| Ash, weight percent | 0.05 |

As many possible embodiments can be made from this invention without departing from the scope thereof, it is to be understood that all matter herein set forth is to be interpreted as illustrative and not as unduly limiting the invention.

I claim:

1. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a copolymer of an aliphatic conjugated diene and a compound selected from the group consisting of

substituted pyridines and quinolines where R is selected from the group consisting of hydrogen and methyl.

2. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a rubbery copolymer of an aliphatic conjugated diene and a compound selected from the group consisting of

substituted pyridines and quinolines where R is selected from the group consisting of hydrogen and methyl.

3. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a liquid copolymer of an aliphatic conjugated diene and a compound selected from the group consisting of

substituted pyridines and quinolines where R is selected from the group consisting of hydrogen and methyl.

4. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a liquid copolymer of 1,3-butadiene and 2-methyl-5-vinylpyridine.

5. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a liquid copolymer of 1,3-butadiene and 2-vinylpyridine.

6. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a liquid copolymer of 1,3-butadiene and 5-ethyl-2-vinylpyridine.

7. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a rubbery copolymer of 1,3-butadiene and 2-methyl-5-vinylpyridine.

8. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a rubbery copolymer of 1,3-butadiene and 2-vinylpyridine.

9. A composition of matter comprising a mixture of, based on 100 parts by weight of said mixture, 93 to 97 parts butyl rubber produced by low-temperature catalytic polymerization of an aliphatic isoolefin having 4 to 7, inclusive, carbon atoms per molecule, with a minor proportion of a conjugated aliphatic diolefin having 4 to 8, inclusive, carbon atoms per molecule and 7 to 3 parts of a rubbery copolymer of 1,3-butadiene and 5-ethyl-2-vinylpyridine.

References Cited in the file of this patent
UNITED STATES PATENTS

| | | |
|---|---|---|
| 2,581,930 | Albert | Jan. 8, 1952 |
| 2,588,993 | Schroeder | Mar. 11, 1952 |
| 2,920,057 | Pritchard | Jan. 5, 1960 |